US010563294B2

(12) United States Patent
Dutta et al.

(10) Patent No.: US 10,563,294 B2
(45) Date of Patent: Feb. 18, 2020

(54) COMPONENT HAVING ACTIVE COOLING AND METHOD OF FABRICATING

(71) Applicant: GENERAL ELECTRIC COMPANY, Schenectady, NY (US)

(72) Inventors: Sandip Dutta, Greenville, SC (US); Srikanth Chandrudu Kottilingam, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 221 days.

(21) Appl. No.: 15/451,914

(22) Filed: Mar. 7, 2017

(65) Prior Publication Data
US 2018/0258518 A1    Sep. 13, 2018

(51) Int. Cl.
C23C 4/18       (2006.01)
B33Y 80/00      (2015.01)
(Continued)

(52) U.S. Cl.
CPC ................ *C23C 4/18* (2013.01); *B33Y 80/00* (2014.12); *C23C 4/11* (2016.01); *F01D 25/12* (2013.01); *B22F 3/1055* (2013.01); *B22F 5/009* (2013.01); *B22F 5/04* (2013.01); *B33Y 10/00* (2014.12); *F05D 2230/10* (2013.01);
(Continued)

(58) Field of Classification Search
CPC .......... F01D 5/186; F01D 5/187; F01D 5/288; F01D 25/12; F01D 9/065
See application file for complete search history.

(56) References Cited

U.S. PATENT DOCUMENTS 6,234,755 B1 * 5/2001 Bunker .................. F01D 5/186
                                                     416/97 R
8,572,983 B2 * 11/2013 Xu .......................... F01D 5/186
                                                        60/752
(Continued)

FOREIGN PATENT DOCUMENTS

EP         2829804 A1    1/2015
WO    2014186006 A2   11/2014
WO    2014186006 A3   11/2014

OTHER PUBLICATIONS

European Search Report issued in connection with corresponding EP Application No. 18160333, dated Sep. 14, 2019.

*Primary Examiner* — Brian P Wolcott
(74) *Attorney, Agent, or Firm* — McNees Wallace & Nurick LLC

(57) ABSTRACT

A method of fabricating a component having active cooling with film holes and other exposed holes is provided. The method includes the step of providing a component including at least one aperture disposed on a surface of the component and fluidly connected to at least one fluid flow passage, the at least one aperture comprising a floor extending from the at least one fluid flow passage to the surface of the component, and a ceiling facing the floor. The method further includes the step of applying a thermal barrier coating over at least a portion of a substrate. The method further includes the step of removing a portion of the thermal barrier coating covering the at least one aperture. The method further includes the step of forming with an additive manufacturing method one or both of a sharp-edged hood of the at least one aperture and at least one feature disposed on the floor.

21 Claims, 3 Drawing Sheets

(51) Int. Cl.
*C23C 4/11* (2016.01)
*F01D 25/12* (2006.01)
*B33Y 10/00* (2015.01)
*B22F 5/04* (2006.01)
*B22F 5/00* (2006.01)
*B22F 3/105* (2006.01)

(52) U.S. Cl.
CPC .... *F05D 2230/22* (2013.01); *F05D 2230/234* (2013.01); *F05D 2230/90* (2013.01); *F05D 2260/202* (2013.01); *F05D 2260/22141* (2013.01)

(56) References Cited

U.S. PATENT DOCUMENTS

| | | | | |
|---|---|---|---|---|
| 8,683,813 | B2* | 4/2014 | Xu | F01D 5/186 |
| | | | | 415/115 |
| 9,273,560 | B2* | 3/2016 | Gleiner | F01D 5/187 |
| 9,909,432 | B2* | 3/2018 | Kottilingam | B22F 7/08 |
| 2012/0164376 | A1* | 6/2012 | Bunker | B23K 26/34 |
| | | | | 428/131 |
| 2013/0269354 | A1* | 10/2013 | Starkweather | F23R 3/06 |
| | | | | 60/754 |
| 2015/0017018 | A1* | 1/2015 | Lacy | F01D 5/288 |
| | | | | 416/97 R |
| 2016/0008889 | A1* | 1/2016 | Xu | F01D 5/186 |
| | | | | 219/76.12 |
| 2016/0061451 | A1 | 3/2016 | Dudebout et al. | |
| 2016/0108739 | A1 | 4/2016 | Musto et al. | |
| 2018/0051567 | A1* | 2/2018 | Bunker | F01D 5/186 |

\* cited by examiner

COMPONENT HAVING ACTIVE COOLING AND METHOD OF FABRICATING

FIELD OF THE INVENTION

The present invention is generally directed to a component with film holes and other exposed holes with sharp-edged hoods and features, and methods for forming the component. More specifically, the present invention is directed to a turbine component having sharp-edged hoods and features, and method for forming the turbine component.

BACKGROUND OF THE INVENTION

Operating temperatures of gas turbine systems including buckets (blades), nozzles (vanes), combustors, shrouds, and other hot gas path components are continuously being increased to provide increased efficiency. As the operating temperatures are increased, components of the turbine systems are modified to increase their temperature capability. One method for increasing the temperature capabilities of a turbine component includes active cooling, for example, using the incorporation of internal cooling holes, through which cool air is forced during turbine engine operation. As cooling air is fed from the cooler side of the component wall through a cooling hole outlet on the hot side, the air assists in lowering the temperature of the hot metal surface.

Another technique for increasing the temperature capabilities of a turbine component includes the application of coatings, such as a bond coat and a thermal barrier coating (TBC). Often, turbine components include both cooling holes and various coatings applied over the surface of the component. Typically, when cooling holes are formed or modified (e.g., repaired) in the component prior to the (re)application of the coatings, the cooling holes are either masked before coating or the coating is removed from the cooling holes after application. Current masking methods are often limited to applying a single masking material, then applying the one or more coatings to the component. The multiple coating applications may diminish the masking material, particularly when multiple application techniques are used, and thus may decrease the effectiveness of the masking method.

BRIEF SUMMARY OF THE INVENTION

In an exemplary embodiment, a method of fabricating a component having active cooling is provided. The method includes the step of providing a component including at least one aperture disposed on a surface of the component and fluidly connected to at least one fluid flow passage, the at least one aperture comprising a floor extending from the at least one fluid flow passage to the surface of the component, and a ceiling facing the floor. The method further includes the step of applying a thermal barrier coating over at least a portion of a substrate. The method further includes the step of machining the component to remove a portion of the thermal barrier coating covering the at least one aperture. The method further includes the step of forming with an additive manufacturing process one or both of a sharp-edged hood of the at least one aperture and at least one feature disposed on the floor.

In another exemplary embodiment, a component having active cooling is provided. The component includes at least one layer of thermal barrier coating deposited onto at least a portion of a surface of a substrate, at least one fluid flow passage, and at least one aperture disposed on the surface of the component and fluidly connected to the at least one fluid flow passage, and one or both of the ceiling forming a sharp-edged hood with surface of the component and at least one feature disposed on the floor. The at least one aperture comprises a floor and a ceiling. The floor extends from the at least one fluid flow passage to the surface of the component. The ceiling faces the floor.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Provided are exemplary methods and components that provide efficient active cooling. Embodiments of the present disclosure, in comparison to articles and methods not utilizing one or more features disclosed herein, enable a reduction in chargeable coolant flow, enable increased turbine efficiency, enable increases heat transfer efficiency, enables increased durability, enable increased reparability, or a combination thereof.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "at least one," as used herein, means one or more and thus includes individual components as well as mixtures/combinations.

The term "comprising" (and its grammatical variations), as used herein, is used in the inclusive sense of "having" or "including" and not in the exclusive sense of "consisting only of."

Figure 1:
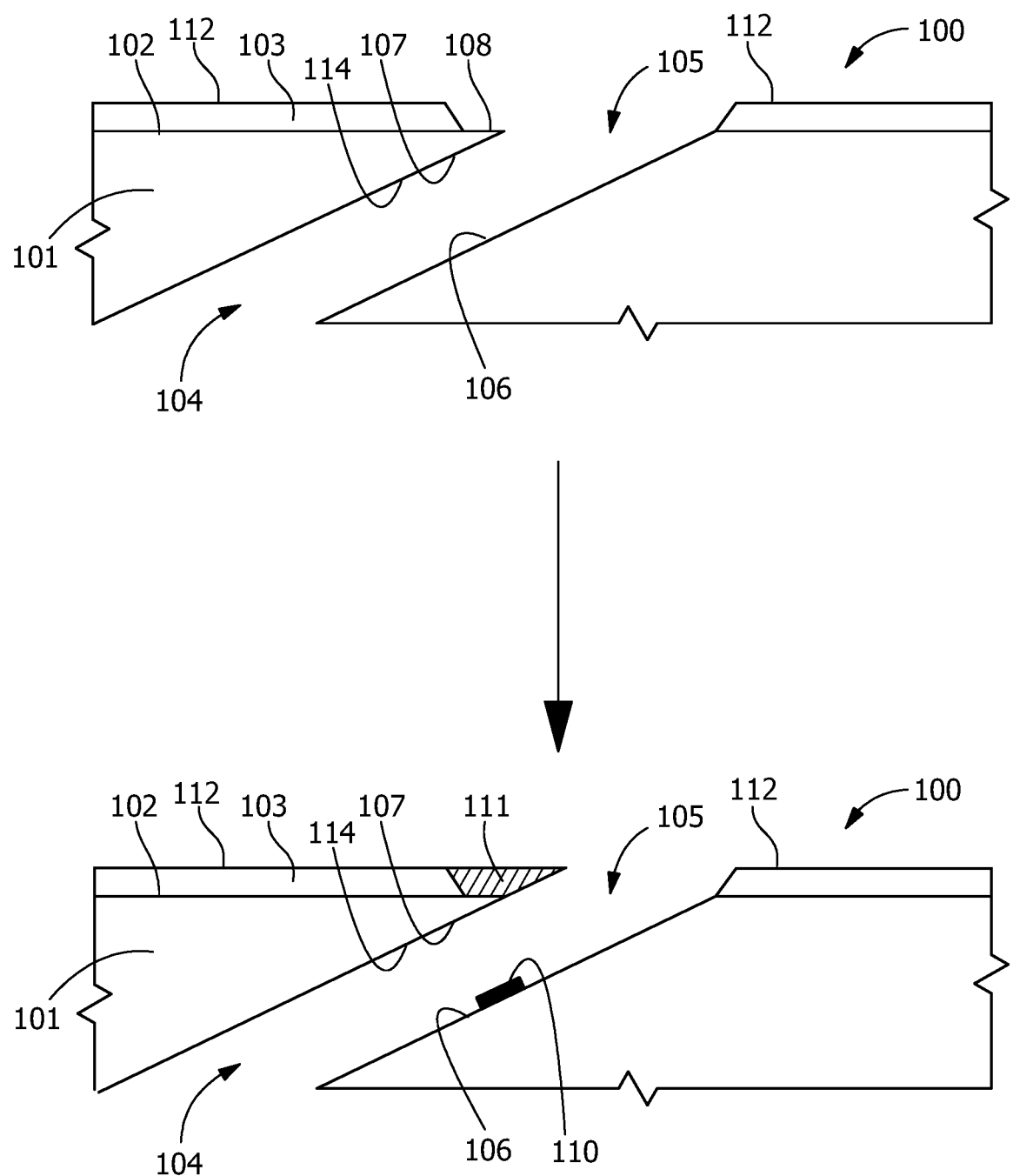
FIG. 1 shows a schematic side view of a component having an exposed hood (top) and a side view of a component having a sharp edged hood (below), according to an exemplary embodiment of the present disclosure.

With reference to FIG. 1, a component 100 having active cooling is shown prior to forming (top) and after forming (bottom) according to a method according to the present disclosure. As shown in FIG. 1, prior to forming one or both of a sharp-edged hood 111 and a feature 110, the component 100 includes a substrate 101, at least one layer of thermal barrier coating 103 deposited onto at least a portion of a surface 102 of a substrate 101, at least one fluid flow passage 104, and at least one aperture 105 disposed on the substrate 101 and fluidly connected to the at least one fluid flow passage 104, and one or both of the ceiling forming a sharp-edged hood with surface 112 of the component and at least one feature 110 disposed on a floor 106. The at least one aperture comprises floor 106 and ceiling 107. Floor 106 extends along a surface of the at least one fluid flow passage 104 to the surface 112 of the component 100. Ceiling 107 includes a surface 114 that extends opposite floor 106 and forms an exposed hood 108 with the surface 102 of the substrate 101 of the component 100. The exposed hood 108 is a portion of the surface 102, which is not covered by the layer of thermal barrier coating 103. At the bottom of FIG. 1, exposed hood 108 is sharpened to form with an additive manufacturing process a sharp-edged hood 111.

In some embodiments, the at least one feature 110 includes, but is not limited to, a step, a rib, a pin, or combinations thereof. Accordingly, the floor 106 will be modified with the at least one feature 110.

In an embodiment, the feature 110 may have a width and height less than or equal to a fourth of a diameter of the at least one aperture 105. In an embodiment, the feature 110 may have a width and height less than or equal to ½, ⅓, ¼, ⅕, ⅙, 1/7, and ⅛ of a diameter of the at least one aperture 105. In an embodiment, the feature 110 may have a width and height less than or equal to an eighth of a diameter of the at least one aperture 105.

In one embodiment, the at least one feature 110 may extend from between ⅓ and ⅔ of the length of the floor 106. In one embodiment, the at least one feature 110 may extend from between ¼ and ¾ of the length of the floor 106.

In on embodiment, MCrAlY is deposited on the at least one feature 110 to function as a bond coat, thereby providing oxidation resistance. A person skilled in the art will appreciate that the at least one feature 110 may be deposited by any suitable bond coat.

In some embodiments, the component 100 may comprise at least a supplemental layer adjacent to the at least one layer of thermal barrier coating 103, for example, intermediate the thermal barrier coating 103 and substrate 101. The supplemental layer may be chosen from one or more of a bond coat, a thermally dissipative coating, and combinations thereof.

In accordance with the methods hereof, a thermally dissipative article is formed according to the steps including applying to at least a portion of a surface of a component a thermally dissipative coating composition comprising a mixture of metal powders comprising at least one of each of a high melt metal powder and a low melt metal powder, and a mixture comprising at least one soluble particulate, the mixture comprising at least one soluble particulate being soluble in a solvent which does not solvate the mixture of metal powders. After application to the component surface, the component is sintered at a temperature and time sufficient to form the thermally dissipative coating composition into a hardened coating. Thereafter, the sintered coated component is immersed in the solvent and removed therefrom, and optionally the steps of immersion and removal may be repeated to provide a coated article with a density of inter-connected pores. According to the various embodiments, the coating composition is applied by one of a variety of suitable methods known in the art, for example but not limited to, spray deposition according a process selected from thermal spray, cold spray, flame spray, and plasma spray.

In some embodiments, the superalloy being selected from the group consisting of nickel based superalloys, cobalt based superalloys and combinations thereof.

Other suitable high-melt metallic materials that may be used in accordance with the various embodiments include materials selected from R80, MM247, RN2, R142, R195, GT33, and combinations of these. Other suitable low-melt metallic materials that may be used in accordance with the various embodiments include materials selected from DF4B, BNi-2, BNi-5, B50TF285, D15, and combinations of these.

In some embodiments, the thermal barrier coating 103 may include, but not be limited to, zirconia and one or more metal oxides that are capable of retarding the propensity of zirconia to form the monoclinic phase. In other embodiments, the thermal barrier coating 103 may include, but not be limited to metal oxides such as yttria, yttrium aluminum oxide garnet, calcia, magnesia, india, scandia, and ytterbia.

In some embodiments, the additive manufacturing technique includes, but is not limited to, direct metal laser melting (DMLM), direct metal laser sintering (DMLS), micro welding or combinations thereof.

In some embodiments, the component 100 is a turbine component selected from shrouds, nozzles, blades, transition piece, and a liner.

Figure 2:
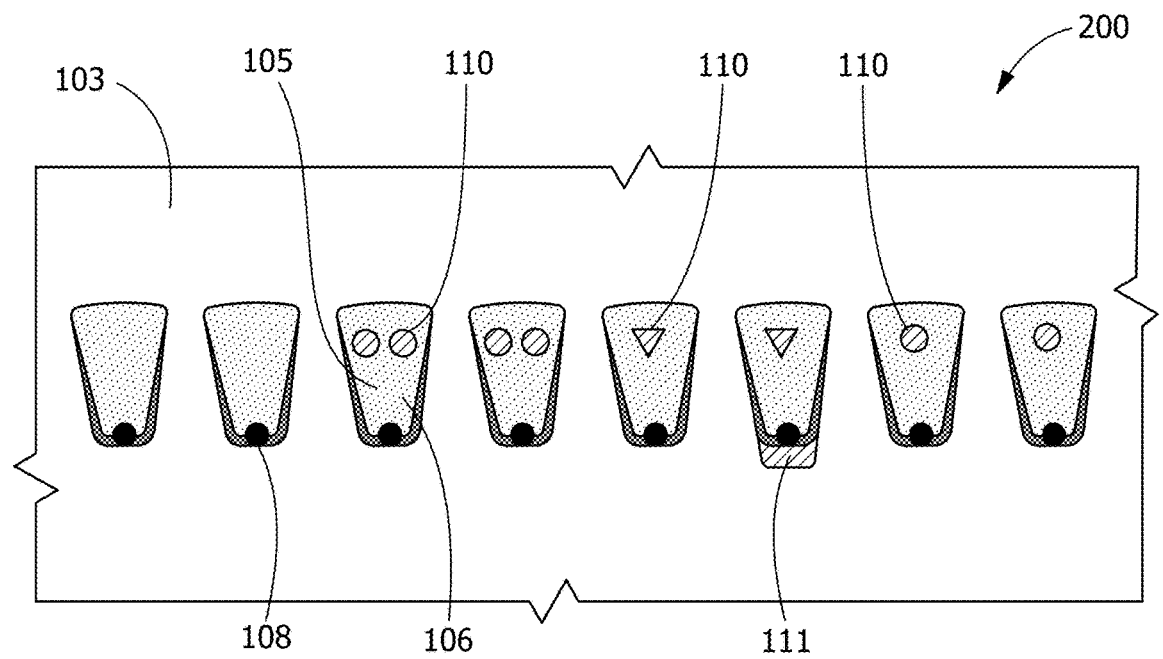
FIG. 2 shows a top view of a component having an exposed hood, according to an exemplary embodiment of the present disclosure.

With reference to FIG. 2, according to an embodiment, a component 200 having an exposed hood 108 is provided. An additive manufacturing method may sharpen the exposed hood 108 to form a sharp-edged hood of the at least one aperture 105.

Figure 3:
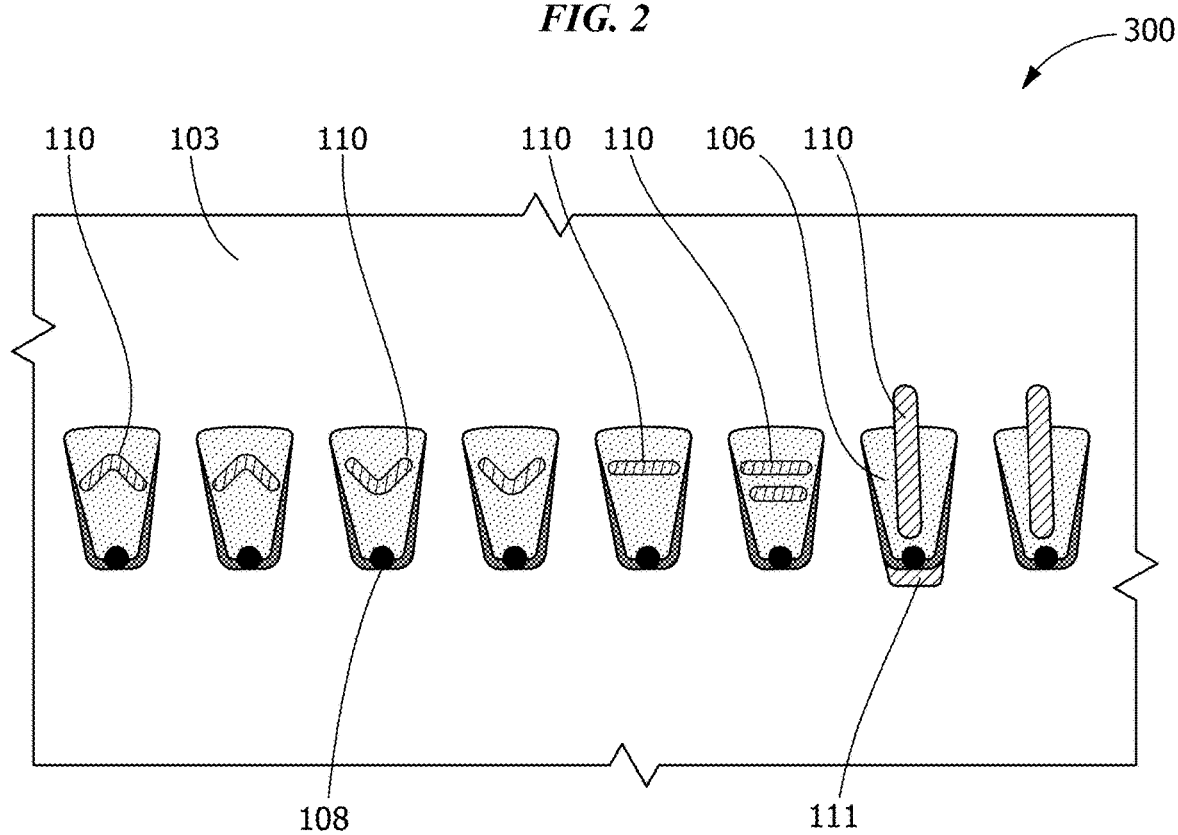
FIG. 3 shows a top view of a component having a feature, according to an exemplary embodiment of the present disclosure.

With reference to FIG. 3, a component 300 shows at least one feature 110 disposed on the floor 106 and sharp edged hoods 111 of at least one aperture 110. As discussed above, the at least one feature 110 may extend from between ⅓ and ⅔ of the length of the floor. In another embodiment, the at least one feature 110 may extend from between ¼ and ¾ of the length of the floor. As shown in FIG. 3, the feature 110 may extend to the surface of the component 300. In another embodiment, the feature 110 may not extend to the surface of the component 300.

In one embodiment, the at least one feature 110 may be v-shaped rib(s), reverse v-shaped rib(s), rib(s) along the flow or rib(s) perpendicular to the flow. Each pin may have different height from each other.

In another embodiment, the at least one feature 110 may be triangular, circular, rectangular, elliptical, trapezoidal, or teardrop-shaped. Each rib may have different height from each other.

Figure 4:
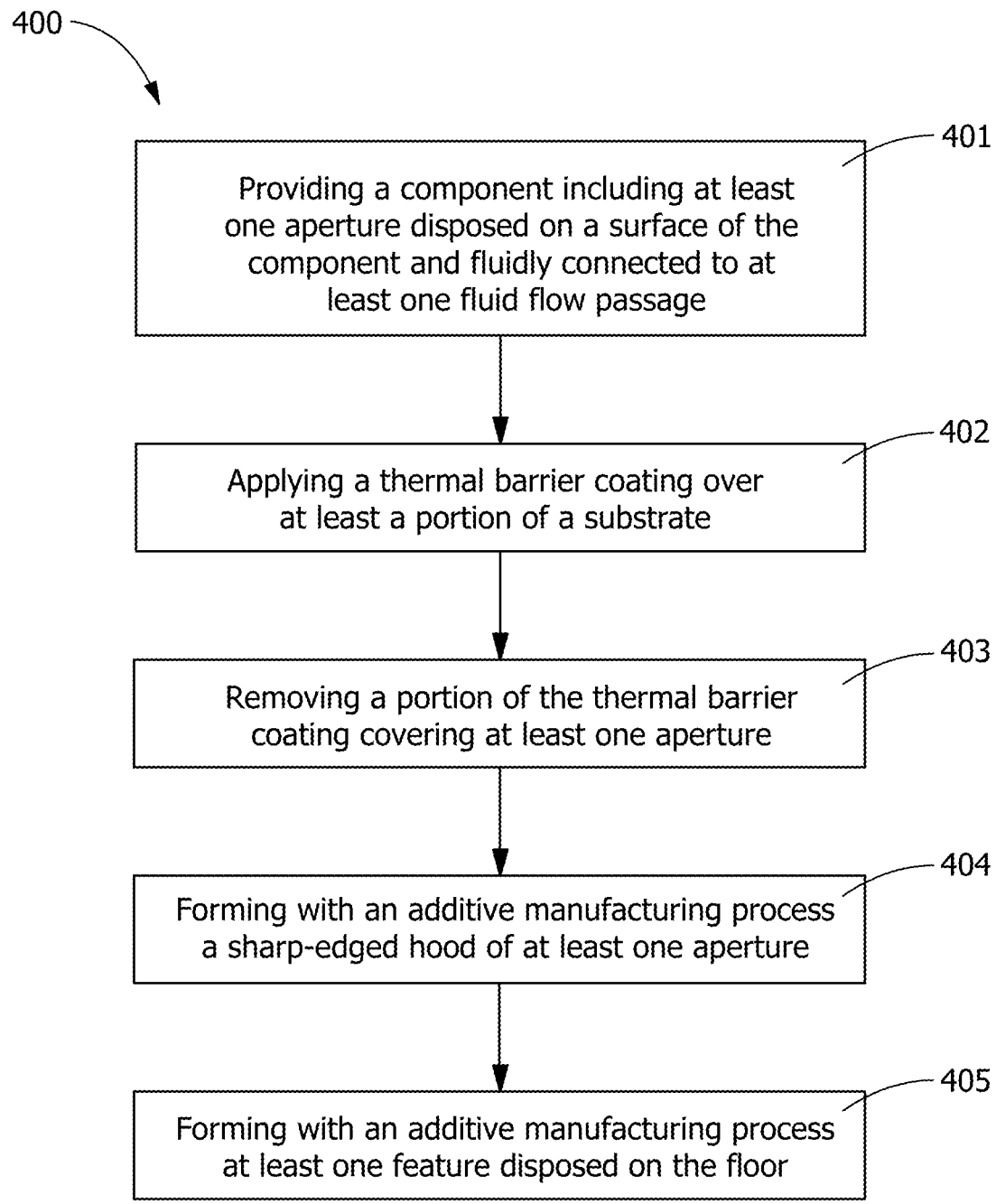
FIG. 4 shows a flow chart diagram illustrating an embodiment of a method, according to an exemplary embodiment of the present disclosure.

With reference to FIG. 4, a method 400 of fabricating a component 100 having active cooling is provided, according to an exemplary embodiment. The method 400 includes the step of providing a component 100 including at least one aperture 105 disposed on a surface of the component 100 and fluidly connected to at least one fluid flow passage 104, the at least one aperture 105 comprising a floor 106 extending from the at least one fluid flow passage 104 to the surface of the component 100, and a ceiling 107 facing the floor 106 (step 401). The method further includes the step of applying a thermal barrier coating 103 over at least a portion of a surface 102 of a substrate 101 (step 402). The method further includes the step of removing a portion of the thermal barrier coating 103 covering the at least one aperture 105 (step 403). The method further includes the step of forming with an additive manufacturing process sharp-edged hood 111 of the at least one aperture 105 (step 404) and/or the step of forming with an additive manufacturing process at least one feature 110 disposed on the floor 106 (step 405).

In one embodiment, the method further includes the step of forming with an additive manufacturing process sharp-edged hoods 111 of the at least one aperture 105 (step 404). In another embodiment, the method further includes the step of forming with an additive manufacturing process at least one feature 110 disposed on the floor 106 (step 405). In another embodiment, the method further includes the step of forming with an additive manufacturing process sharp-edged hood 111 of the at least one aperture 105 (step 404) and the step of forming with an additive manufacturing process at least one feature 110 disposed on the floor 106 (step 405).

In some embodiments, the machining includes, but is not limited to, water jet machining. Machining creates exposed hood 108, and makes floor 106 rough. These can be corrected with additive manufacturing technology such as DMLM, DMLS, or combinations thereof. The manufacturing technology sharpens the exposed hood 108 and creates features 110 on the floor 106.

In some embodiments, the additive manufacturing process comprises melting the thermal barrier coating 103 and/or the at least a supplemental layer on the surface of the substrate 101 using a direct metal laser melting technique.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of fabricating a component having active cooling, comprising:
providing a component including at least one aperture disposed on a surface of a substrate of the component and fluidly connected to at least one fluid flow passage, the at least one aperture comprising a floor extending from the at least one fluid flow passage to the surface of the substrate, and a ceiling facing the floor;
applying a thermal barrier coating over at least a portion of the surface of the substrate;
removing a portion of the thermal barrier coating covering the at least one aperture;
forming with an additive manufacturing process a sharp-edged hood of the at least one aperture disposed on the surface of the substrate and contiguous with a component surface of the component and a ceiling surface of the ceiling,
wherein the sharp-edged hood consists of a metallic material, the metallic material of the sharp-edged hood directly contacting the component surface at the ceiling surface and being remote from the component surface at the floor, wherein the sharp-edged hood is adjacent to the at least one fluid flow passage and remote from a nearest second fluid flow passage.

2. The method according to claim 1, further comprising forming with an additive manufacturing process at least one feature disposed on the floor.

3. The method according to claim 2, wherein the at least one feature is selected from the group consisting of a step, a rib, a pin, and combinations thereof.

4. The method according to claim 2, wherein the at least one feature has a width and height less than or equal to a fourth of a diameter of the at least one aperture.

5. The method according to claim 2, wherein the at least one feature extends from between $\frac{1}{3}$ and $\frac{2}{3}$ of a length of the floor.

6. The method according to claim 5, wherein the at least one feature extends to the component surface of the component.

7. The method according to claim 1, wherein removing comprises water jet machining.

8. The method according to claim 1, wherein the component further comprises;
at least one supplemental layer adjacent to the thermal barrier coating, the at least one supplemental layer being selected from one or more of a bond coat, a thermally dissipative coating, and combinations thereof, wherein the at least one supplemental layer extends from the sharp-edged hood and maintains a sharp-edged geometry.

9. The method according to claim 1, wherein the additive manufacturing process comprises melting the thermal barrier coating and/or at least one supplemental layer on the surface of the substrate using a technique selected from the group consisting of direct metal laser melting, direct metal laser sintering, micro welding, and combinations thereof.

10. The method according to claim 8, further comprising:
sintering the component at a temperature and time sufficient to form a thermally dissipative coating composition into the thermally dissipative coating;
immersing the component in a solvent; and
removing the component;
wherein the component comprises the thermally dissipative coating with a density of inter-connected pores.

11. The method according to claim 1, wherein the component is a turbine component selected from a shroud, a nozzle, a blade, a transition piece, and a liner.

12. A component having active cooling, comprising:
at least one layer of thermal barrier coating deposited onto at least a portion of a surface of a substrate;
at least one fluid flow passage;

at least one aperture disposed on a component surface of the component and fluidly connected to the at least one fluid flow passage, the at least one aperture comprising:
- a floor extending from the at least one fluid flow passage to the component surface of the component;
- a ceiling facing the floor; and
- a sharp-edged hood disposed on the surface of the substrate and contiguous with the component surface of the component and a ceiling surface of the ceiling, wherein the sharp-edged hood consists of a metallic material, the metallic material of the sharp-edged hood directly contacting the component surface at the ceiling surface and being remote from the component surface at the floor, wherein the sharp-edged hood adjacent to the at least one fluid flow passage and remote from a nearest second fluid flow passage.

13. The component according to claim 12, further comprising at least one feature disposed on the floor.

14. The component according to claim 13, wherein the at least one feature is selected from the group consisting of a step, a rib, a pin, and combinations thereof.

15. The component according to claim 13, wherein the at least one feature has a width and height less than or equal to a fourth of a diameter of the at least one aperture.

16. The component according to claim 13, wherein the at least one feature extends from between ⅓ and ⅔ of a length of the floor.

17. The component according to claim 16, wherein the at least one feature extends to the component surface of the component.

18. The component according to claim 12, further comprising:
- at least one supplemental layer adjacent to the at least one layer of thermal barrier coating, the at least one supplemental layer being selected from one or more of a bond coat, a thermally dissipative coating, and combinations thereof, wherein the at least one supplemental layer extends from the sharp-edged hood and maintains a sharp-edged geometry.

19. The component according to claim 18, wherein the at least one supplemental layer includes the bond coat and the thermally dissipative coating, and the thermally dissipative coating is adherent to the bond coat applied between the at least one layer of thermal barrier coating and the thermally dissipative coating.

20. The component according to claim 12, wherein the component is a turbine component selected from a shroud, a nozzle, a blade, a transition piece, and a liner.

21. The component according to claim 13, wherein the sharp-edged hood of the at least one aperture and the at least one feature disposed on the floor are formed by an additive manufacturing process.

* * * * *